United States Patent [19]

Cohen

[11] Patent Number: 4,923,574

[45] Date of Patent: May 8, 1990

[54] METHOD FOR MAKING A RECORD MEMBER WITH A METALLIC ANTIFRICTION OVERCOAT

[76] Inventor: Uri Cohen, 765 San Antonio Rd., Unit 53, Palo Alto, Calif. 94303

[21] Appl. No.: 368,119

[22] Filed: Jun. 16, 1989

Related U.S. Application Data

[60] Continuation of Ser. No. 61,512, May 15, 1987, abandoned, which is a division of Ser. No. 747,612, Jun. 21, 1985, Pat. No. 4,678,722, which is a continuation-in-part of Ser. No. 670,135, Nov. 13, 1984, abandoned, which is a continuation of Ser. No. 405,062, Aug. 4, 1982, abandoned.

[51] Int. Cl.$^5$ .................. C25D 5/10; C25D 3/56; C25D 3/64; G11B 5/84

[52] U.S. Cl. .................. 204/40; 204/43.1; 204/44.5; 204/DIG. 6; 427/130; 427/131; 428/695; 428/692; 360/131; 360/135

[58] Field of Search ............ 204/40, 42, 43.1, 44.4, 204/44.5, DIG. 6; 428/692, 693, 694, 695; 427/127, 128, 129, 130, 131, 132; 360/131, 135

[56] References Cited

U.S. PATENT DOCUMENTS

| | | | |
|---|---|---|---|
| 2,283,219 | 5/1942 | McCullough | 308/242 |
| 2,545,566 | 3/1951 | Booe | 204/53 |
| 3,480,522 | 11/1969 | Brownlow | 204/40 |
| 3,531,322 | 9/1970 | Kefalas et al. | 427/129 |
| 3,682,604 | 8/1972 | Gerard et al. | 92/37 |
| 3,767,369 | 10/1973 | Barlow | 428/648 |
| 3,928,159 | 12/1975 | Tadokoro et al. | 204/192.31 |
| 3,973,920 | 8/1976 | Tadokoro et al. | 29/194 |
| 4,029,541 | 6/1977 | Barlow et al. | 427/130 |
| 4,069,360 | 1/1978 | Yanagisawa et al. | 428/623 |
| 4,108,739 | 8/1978 | Tadokoro et al. | 204/40 |
| 4,124,736 | 11/1978 | Patel et al. | 428/622 |
| 4,152,487 | 5/1979 | Yanagisawa | 428/621 |
| 4,162,350 | 7/1979 | Yanagisawa | 428/633 |
| 4,190,872 | 2/1980 | Jones, Jr. et al. | 360/125 |
| 4,242,710 | 12/1980 | Hempstead et al. | 360/113 |
| 4,269,671 | 5/1981 | Cohen et al. | 204/23 |
| 4,307,156 | 12/1981 | Yanagisawa | 428/623 |
| 4,326,229 | 4/1982 | Yanagisawa | 360/135 |
| 4,380,558 | 4/1983 | Yanagisawa | 427/53.1 |
| 4,390,562 | 6/1983 | Yanagisawa | 427/623 |
| 4,411,963 | 10/1983 | Aine | 428/622 |
| 4,456,661 | 6/1984 | Yamamoto | 428/607 |
| 4,499,138 | 2/1985 | Yamamoto | 428/216 |

FOREIGN PATENT DOCUMENTS

| | | | |
|---|---|---|---|
| 5276005 | 6/1977 | Japan | 360/135 |
| 5518986 | 5/1980 | Japan | 428/928 |
| 221452 | 10/1968 | U.S.S.R. | |
| 794968 | 5/1958 | United Kingdom | 420/501 |
| 1136491 | 12/1968 | United Kingdom . | |
| 1136493 | 12/1968 | United Kingdom . | |
| 1210270 | 10/1970 | United Kingdom | 204/DIG. 9 |
| 2082477 | 3/1982 | United Kingdom | 428/694 |

OTHER PUBLICATIONS

E. M. Rossi et al., "Vacuum-Deposited Thin-Metal-Film Disk", J. Appl. Phys. 55(6), Mar. 15, 1984.

(List continued on next page.)

*Primary Examiner*—John F. Niebling
*Assistant Examiner*—Starsiak, Jr. John S.
*Attorney, Agent, or Firm*—Skjerven, Morill, MacPherson, Franklin and Friel

[57] ABSTRACT

A magnetic recording member with a thin metallic antifriction protection overcoat formed over a magnetic layer. The overcoat is soft ductile and low stress and includes a metal selected from the group consisting of palladium, platinum, silver, gold, cadmium, indium, tin and lead or an alloy of one or more of these metals, and may include less than 20 percent by weight of antimony, bismuth, thallium or copper to improve wear resistance or impede corrosion. In one preferred embodiment the antifriction overcoat is an alloy of silver, lead and antimony formed with N layers where $10 \leq N \leq 40$. The even layers are richer in a selected metal of the alloy than the odd layers in order to produce adjacent layers with different lattice or microstructural and associated mechanical properties so that there tends to be parallel shear between adjacent layers under sharing stress of head impact or friction. The metallic antifriction overcoat is formed by electroplating and the layers are formed by cyclically modulating the plating current density (or cathode potential) in order to form the N layers each having a selected thickness and a selected composition.

40 Claims, 8 Drawing Sheets

OTHER PUBLICATIONS

Namba et al., "Structural Study of the Diamond Phase Carbon Films Produced by Ionized Deposition", J. Vac. Sci Tecnol. A3(2) Mar./Apr., 1985, pp. 319–323.
Gambino et al., "Spin Resonance Spectroscopy of Amorphous Carbon Films", Solid State Communications, vol. 34, pp. 15–18.
Pergamon Press Ltd., 1980 printed in Great Britain.
Dischler, et al., "Amorphous Carbon Coatings Prepared by High Rate rf Plasma Deposition from Fluorinated Benzenes", Appl. Phys. Lett 46(8), pp. 739–741, Apr. 15, 1985.
Fedot'ev et al., "Electrolytic Deposition of Silver-Antimony Alloy", translated from Zhurnal Prikladnoi Khimii, vol. 37, No. 3, pp. 585–590, Mar., 1964.
W. J. Safrank, "The Properties of Electrodeposited Metals and Alloys", American Elsevier Pub. Co., New York (1974).
Chapters 17, Silver and Silver Alloys.
A. Brenner, "Electrodeposition of Alloys", Cap. 20, Copper-Lead and Silver-Lead Alloys, Academic Press, New York (1963).
Faust et al., "Electrodeposition of Silver-Lead Alloys for Bearings", Trans. Electrochem. Soc. 75, 185–196 (1939).
M. Hanse, "Constitution of Binary Alloys", McGraw-Hill, 1965, pp. 40–41, shows the solubility of silver in lead.
Faust, "Introduction to Electroplating and Preplating Operations", American Soc. for Metals (1976), Metals Park, Ohio, pp. 1-1, 1-2, 9-11 through 9-20.
Cohen et al., "Development of Silver-Palladium Alloy Plating for Electrical Contact Applications", J. Electrochem. Soc., 131 (11), Nov. (1984), pp. 2939–2495.
Hawkins et al., "Constitution of Binary Alloys", pp. 251–256, 339–341, from Metals Handbook, vol. 8, eight edition, American Soc. for Metals, 1973.
Cohen et al, "Electroplating of Cyclic Multilayered Alloy (CMA) Coatings", J. Electrochem. Soc. 130 (10), (1983), pp. 1987–1995.
Sel-Rex Operating Instructions, Sel-Rex Pur-A-Gold 401, Oxy Metal Industries Corporation, Aug., 1972.
F. A. Lowenheim, "Electroplating", pp. 276–277 McGraw-Hill (1978).
K. N. Tu, "Kinetics of Thin-Film Reaction Between Pb and AgPd", J. Applied Physics, 48 (8), 3400–3404 Aug. (1977).
Cohen, et al., "Electroplating of Silver-Palladium Alloy for Contact Applications", Abstract No. 309, Electrochem Soc. Corp., pp. 759–760, Denver, CO., Oct., 1981.
Cohen, et al., "Electroplating of Cyclic Multilayered Alloy (CMA) Coatings", Abstract No. 310, Electrochem Soc. Conf. pp. 761–762, Denver, Colorado, Oct., 1981.
U. Cohen, "Electroplating of CO-W Cyclic Multilayered Alloys (CMA) for Applications in Wear Resistance and Magnetic Coatings", Electrochem Soc., Conf., pp. 772–774, Abstract 315, Denver, CO, Oct., 1981.
Cohen, "Reversal Current Step Voltammetry (RCSV) Technique for Studies of High Rate Electrodeposition Process of a Solid Electrode", Abstract No. 614, Electrochem Soc. Conf., pp. 1479–1481, Denver, CO, Oct., 1981.
H. J. Weisner, et al., "Physical and Mechanical Properties of Electroformed Gold-Copper Alloys", Plating, pp. 799–804, Jul., 1969.
R. Duva et al., "Properties of Some Gold Electrodeposits", Plating, pp. 1056–1062, Oct., 1968.
"Metals Handbook", 8th Ed., vol. 1, Properties and Selection of Metals, Sleeve Bearing Materials, pp. 843–863, 1961 Amer. Soc. for Metals, Metals Park, Ohio.
Yang et al, "Enhanced Elastic Modulus in Composition-Modulated Gold-Nickel and Copper-Palladium Foils", J. of Appl. Physics, vol. 48, No. 3, Mar., 1977.
H. E. Cook et al., "Effect of Gradient Energy on Diffusion in Gold-Silver Alloys", J. Appl. Phys., pp. 2191–2198, vol. 40, No. 5, Apr., 1969.
J. DuMond et al, "An X-Ray Method of Determining Rates of Diffusion in the Solid State", J. Appl. Phys., pp. 357–365, vol. 11, May, 1940.
M. B. Brodsky, "Enhanced Magnetism in Metal Film Sandwiches", J. Appl. Phys. pp. 1665–1669, vol. 52, No. 3, Mar., 1981.
A. K. Stiffler, "Friction and Wear with a Fully Melting Surface", J. of Tribology, vol. 106, pp. 416–419, Jul., 1984.

(List continued on next page.)

OTHER PUBLICATIONS

V. Bicego et al., "Lubrication of a Melting Slider Under Nonisothermal Conditions", J. of Tribology Tech. (Transactions ASME), vol. 103, pp. 436–442, Jul., 1981.

W. R. Wilson, "Lubrication by a Melting Solid", J. Lubrication Tech. (Transactions ASME), pp. 22–26, Jan., 1976.

B. Sternlicht et al, "Investigation of 'Melt Lubrication'", ASLE Trans., vol. 2, pp. 248–255 (1960).

R. S. Montgomery, "Friction and Wear at High Sliding Speeds", Wear, 36 (1976) 275–298, Elsevier Sequoia S.A., Lausanne, Printed in the Netherlands.

R. S. Montgomery, "Surface Melting of Rotating Bands", Wear, 38 (1976) 235–243 Elsevier Sequoia S.A., Lausanne, Printed in the Netherlands.

"IBM's Thin-Film Heads Squeeze Disk Capacity to Record Levels", Electronics Design 5, pp. 60–63, Mar. 1, 1980.

"Thin-Film Read/Write Heads Promise Higher Disc Recording Densities", EDN, 89–98, Jun. 5, 1980.

"Thin-Film Magnetic Heads Excel in Packing and Moving Data", Electronics, pp. 97–103, Mar. 3, 1977.

Bregman, Adolph, "Silver for Bearings", The Metal Industry, Dec. 18, 1942, pp. 389–392.

N. Ahmed, "Ion Plating Technology", John Wiley & Sons, (1987), pp. 118–124; 140–141, 147–149; 156–158.

(Not to Scale)

LEAD CONTENT Vs. CURRENT DENSITY

Pb, Sb CONTENT Vs. CURRENT DENSITY (Not to Scale)

Pb, Sb OF CMA Ag-Pb-Sb Vs. avg. i

METHOD FOR MAKING A RECORD MEMBER WITH A METALLIC ANTIFRICTION OVERCOAT

This application is a continuation of application Ser. No. 061,512, now abandoned, filed May 15, 1987, which is a division of application Ser. No. 747,612, now U.S. Pat. No. 4,678,722, filed June 21, 1985, which is a continuation-in-part of copending U.S. application Ser. No. 06/670,135 filed Nov. 13, 1984, which is incorporated herein by reference. U.S. application Ser. No. 06/670,135 now abandoned, is a continuation of U.S. application Ser. No. 06/405,062, now abandoned, filed on Aug. 4, 1982.

FIELD OF THE INVENTION

This invention relates to a metallic antifriction overcoat for magnetic recording media and to a method for making same, in particular, to an antifriction coating for metallic thin-film media.

BACKGROUND OF THE INVENTION

Memory systems using "hard disks" to store information in annular tracks concentrically arranged in magnetic material formed on a disk surface are well known in the prior art. The information (often called "data") is stored in magnetic domains and each domain typically stores an encoded data bit. A major advantage of this type of memory system is that information can be easily stored on a selected track on a disk surface as the disk rotates at high speed and can be randomly accessed at high speed to store information or to read out information stored on a given track. A read-write head or transducer having a small coil and a magnetic core is moved across the disk surface to the track on which the desired information is to be stored, or from which the desired information is to be retrieved while the disk is spinning. The read-write head stores or detects data in a selected data track on the disk surface. Ideally, the head rides on a thin layer of air generated by the spinning disk. It is then said to fly over the disk surface. However, due to imperfections in the disk surface or to other operating factors such as system vibrations, the head may come into undesired contact with the magnetic film during flight while the disk is spinning, causing instant friction between the head and the magnetic film which may ultimately lead to the destruction of the film and to a head crash Also, during start/stop there is intimate contact between the head and the disk surface with associated friction which may lead to excessive wear, head crash, or stiction. Stiction may be defined as head/disk adhesion strong enough to require manual removal of the head, resulting in severe marks on the disk surface Stiction is often encountered when using relatively thick liquid lubricant or when the memory system is operating under conditions of high relative humidity.

In the prior art various techniques have been used to reduce the friction between the head and the magnetic film and the associated damage caused by it.

In memory systems which utilize "flexible" media such as magnetic tape or floppy disks, the space between the moving medium and the read/write head is much smaller than in hard disk systems, and there is continuous intimate contact between the medium and the read/write head. In both hard and flexible media, a magnetic film is formed on a substrate. For a hard disk, the substrate is typically an aluminum alloy with a relatively thick and hard undercoat formed thereon. The magnetic film is formed on the undercoat and is typically a cobalt phosphorus alloy or particulate oxide. The technique used to reduce friction or contact damage depends on the composition and quality of the magnetic film.

One method of forming a magnetic film on a disk substrate involves suspending iron-oxide powder in a liquid media containing resins and coating the disk surface with the liquid. The disk is then cured in a strong magnetic field to provide the desired anisotrophy of magnetization. Such particulate magnetic films are typically formed to a thickness of between 0.7 and 5.0 microns, although recently particulate films having a thickness approaching 0.5 micron have been employed. These particulate iron-oxide magnetic films have a porous surface, and for these surfaces, one antifriction coating technique consists in applying a thin film of an organic lubricant, i.e., an organic liquid or wax such as Fomblin or Bareco. These organic lubricants are not very satisfactory because they tend to spin off the disk when the disk is rotated at operating speeds, e.g., 3600 rpm.

The trend in magnetic films has been to thinner films, because generally speaking, the thinner the magnetic film, the greater the information storage density, and to metal alloy film, as opposed to particulate oxide films. Particulate oxide films are porous and have low remanance due to their relatively small volume fraction of magnetic material in the resin. Since the magnitude of the read back signal is directly related to the remanance of the film, particulate oxide films are necessarily thick relative to alloy films of the same remenance.

The quest for thin magnetic films has led to several deposition techniques. Thin films typically comprise magnetic alloys of cobalt with such elements as phosphorus, nickel, chromium, or tungsten. Methods of deposition of thin magnetic alloy films include electroless, electroplating, sputtering, evaporation and other vapor deposition techniques. Thin magnetic films may also be formed by vapor deposition or sputtering of a magnetic metal oxide such as iron oxide in the form of $Fe_3O_4$ or $Fe_2O_3$ or by oxidation of metallic iron or by thermal decomposition of iron salts. Thin magnetic films typically have a thickness of 600-2000 Å, although even thinner films are extant, some having a thickness in the range of 300 Å. These thin magnetic films generally have a smooth, nonporous surface, and the prior art liquid or waxy lubricants that were marginally satisfactory for particulate films, are less satisfactory for smooth, thin films since a liquid or waxy lubricant spins off the disk after a short period of operation.

Powdered non-metallic solid lubricants, such as graphite and molybdenum disulfide have been applied to plated thin magnetic films by rubbing under pressure, but have proven to be unsatisfactory. (See Yanagisawa, U.S. Pat. No. 4,390,562, issued June 28, 1983). In general, these lubricants are made of loose particles which often detach and break, leading to a head crash. The particles are too large, e.g. 3 microns, average diameter, for an adequate thin layer of lubricant, and they present poor adhesion to metallic magnetic films.

Since no satisfactory antifriction lubricants have been devised for thin magnetic films, the trend has been to use an extremely hard protective coating, such as plated rhodium and nickel-tin, which have a hardness in the range of 500-1000 $Kg/mm^2$, and sputtered carbon, which has a hardness in the range of 3,000-5,000

Kg/mm$^2$, as shown by R. J. Gambino and J. A. Thompson. Solid State Communications, Vol. 34 pp. 15–18 (1980). While these hard coatings tend to protect the magnetic medium from the head riding above the disk, they have several drawbacks: one, they are generally expensive to implement: two, since they are so extremely hard, they tend to cause wear of the head riding on their surface This tends merely to shift the wear problem from the disk to the head (and increasing the hardness of the head tends to shift the problem back to the disk).

In the case of sputtered carbon, the sputter deposition equipment is very expensive, the throughput low, and it is difficult to control its adhesion to the magnetic film and its crystalline character.

Rhodium, which is often taught, is still unsatisfactory in its performance. To assure effective protection, a thick layer of rhodium, typically on the order of about ten micro inches, has been employed. See U.S. Pat. No. 3,767,369, "Duplex Metallic Overcoating", issued Oct. 23, 1973, which is incorporated herein by reference. The '369 patent proposes an alternative to rhodium comprising a duplex of an at least 2 micro inches thick layer of an alloy of nickel and tin overlaid by a layer of rhodium at least 2 micro inches thick. The nickel-tin layer contains a proportion of nickel of about 35% by weight. Again, this nickel-tin alloy undercoat has a Vickers hardness of 500 to 900. More recently, a layer of rhodium 750 Å thick has been suggested as a protective layer in combination with a thin layer of liquid lubricant, Dupont 804. See Rossi, et al, "Vacuum Deposited Thin Metal Film Disk", J. Appl. Phys., 55 (No. 6) 2254 (1984), which is incorporated herein by reference. Such a combination ignores the long-term reliability problem due to the spin-off of the lubricant. Also, the total thickness of the overcoat, including chromium, rhodium, and liquid lubricant is about 1,000 Å.

SUMMARY

The present invention provides a magnetic recording member with a thin metallic antifriction protective overcoat formed over a magnetic layer. The recording member may be for example, a hard disk, a floppy disk or a magnetic tape. The overcoat is very soft compared to the rhodium and sputtered carbon coatings used in the prior art. The antifriction overcoat is also soft compared to both the ferromagnetic alloy of the magnetic layer and compared to the composition of the head which is typically composed of ferrite or alumina and titanium carbide.

In one embodiment the antifriction metallic overcoat comprises a metal selected from the group consisting of palladium, platinum, silver, gold, cadmium, indium, tin, and lead, or an alloy including one or more of the above metals. Less than 20% by weight of one or more of the elements antimony, bismuth, thallium, or copper is added to improve wear resistance or corrosion resistance. The overcoat is deposited so that it has a hardness of less than 250 Kg/mm$^2$, a stress less than 20 Kg/mm$^2$, and a ductility as measured by elongation of 5% or more.

In particular, in one embodiment the overcoat includes an alloy of silver and lead with the lead content of the alloy being less than 12% by weight. In another embodiment the overcoat layer includes an alloy of silver-lead and less than 10% antimony by weight.

In one preferred embodiment the antifriction overcoat comprises a plurality of layers with the even layers richer in a selected metal of alloy than the odd layers. A method for obtaining this multilayered metallic antifriction overcoat is disclosed which includes electroplating an alloy over the magnetic layer of the recording member by controlling the plating current density (or cathode potential). The concept of forming a multilayered antifriction metallic overcoat using the soft ductile and low stress alloys described above is new and entirely different from the present trends.

If desired, the plating current density (or cathode potential) used to produce the multilayered structure may be selected to have a stepped, triangular, or sinusoidal waveform which is a periodic function of time. Once the plating bath is selected the composition and thickness of each layer is selected independently by controlling the current density (or cathode potential), as a function of time.

The multilayered metallic antifriction overcoat of the present invention forms layers which are alternately richer and poorer in a selected metal for the purpose of forming layers with different lattice or microstructural properties so that there tends to be horizontal (or parallel) shear between adjacent layers under shearing stress of head impact or friction. This layering reduces the damage caused by head impact and the friction between the head and the underlying magnetic recording member.

DETAILED DESCRIPTION

Figure 1:
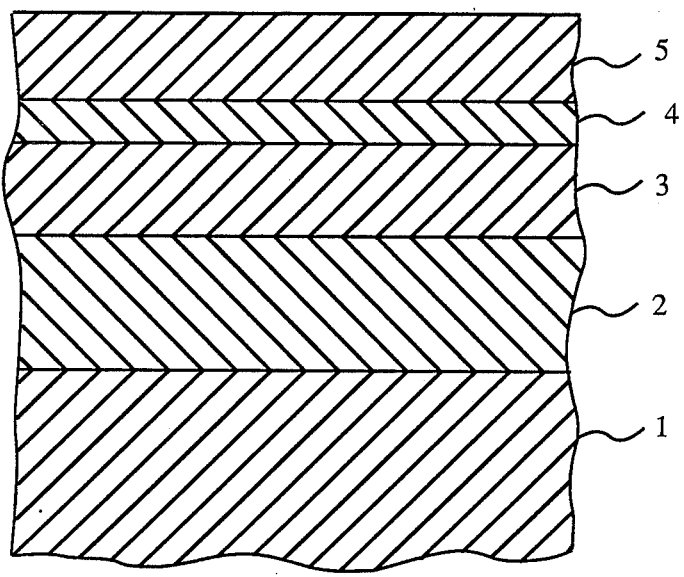
FIG. 1 shows a schematic cross-section of a hard disk.

FIG. 1 shows a cross-sectional view of a hard disk. As shown in FIG. 1, the hard disk includes substrate 1, typically an alloy of aluminum, on which is deposited an undercoat 2, for example, nickel phosphorus which has a hardness of 400 to 700 Kg/mm$^2$. A thin magnetic film 3 for storing information is deposited on undercoat 2. Film 3 may be formed using known processes, for example, magnetic film 3 may be a ferromagnetic alloy such as cobalt phosphorus which is deposited using prior art electroless or electroplating techniques. Alternatively, magnetic film 3 may be deposited using sputtering or evaporation techniques. See "Vacuum Deposited Thin Metal Film Disk", J. Appl. Physics, 55 (6), 2254 (1984).

Magnetic film 3 may be either a ferromagnetic alloy or a metal oxide. In the preferred embodiment, magnetic film 3 is a thin layer of electroplated cobalt tungsten or cobalt nickel phosphorus which is deposited by a method described in copending U.S. patent application Ser. No. 06/670,135, filed Nov. 13, 1984, by the inventor of this application entitled "A Method for Electrodeposition of Cyclic Multilayered Alloy Coatings", which is incorporated herein by reference. Copending U.S. patent application Ser. No. 06/670,135 is a continuation of U.S. application Ser. No. 06/405,062, filed Aug. 4, 1982, also by the inventor of this application.

Following the formation of magnetic film 3, a thin initial electrodeposit or strike 4 of a noble metal is formed over magnetic film 3 using an electrolytic cell. An electrolytic cell is well known in the art as a means of plating metal on a substrate. Such cells are usually composed of a pair of electrodes extending into an electrolyte bath and connected to an electric power supply such that when a direct current is applied, the cathode (substrate) is negatively polarized and the anode is positively polarized. Current will flow in the solution from the anode to the cathode. This current is referred to as the plating current. As a result of such current, metallic ions in solution will be deposited on the cathode. In one embodiment, the strike employs Sel Rex ™ Pure A Gold number 401 diluted with deionized water in the ratio of 1:1, by volume, and having a gold concentration in the range of 1 to 10 grams per liter. The concentration should be low to reduce any displacement reaction, i.e., to reduce the displacement of the magnetic film by the gold. Also, the low gold concentration makes the bath less costly The pH of the gold strike is neutral or slightly acidic to prevent passivation of the magnetic layer and is preferably in the range of 5.5 to 6.5. The gold strike bath is at room temperature during the strike which is carried out for approximately 1 to 3 seconds at a current density typically about 8 to 15 milliamperes/cm$^2$ at the disk surface which serves as the cathode in order to deposit a gold strike having a thickness of approximately 100 Å. The low gold concentration and the high current density ensure good throwing power and uniform coverage of the substrate. A platinum or platinized titanium screen is used as the anode.

The purpose of the gold strike is to facilitate adhesion of the antifriction overcoat and to prevent the contamination of the subsequent overcoat bath by a displacement reaction. Other noble metals, such as platinum, palladium, iridium, rhodium, osmium, ruthenium or silver, or their alloys, may also be utilized for strike layer 4 The thickness of strike layer 4 should be, on one hand, as thin as possible in order to decrease the total gap between the head poles and magnetic film 3, and on the other hand should be thick enough to provide good protection against displacement reactions and good adhesion of overcoat 5. The latter requirements impose a minimum thickness. An adequate thickness of strike layer 4 is in the range of 25 to 250 Å, and preferably in the range of 50 to 150 Å. When deposition of the antifriction overcoat is carried out by a vapor deposition technique, such as sputtering or evaporation, strike layer 4 may be omitted altogether. The antifriction overcoat 5 may then be deposited directly onto the magnetic film 3 which may then consist of either metallic or oxide magnetic film. Following the formation of the strike, the disk is rinsed in deionized water and a very thin antifriction metallic coating 5, which provides lubrication between the head and the underlying disk, is deposited over the strike 4. The purpose of thin antifriction metallic coating 5 is to prevent head crash by reducing the detrimental friction occurring between the head and the disk during contact start/stops and during occasional contact in flight while the disk is rotating.

EXAMPLE 1

Figure 2:
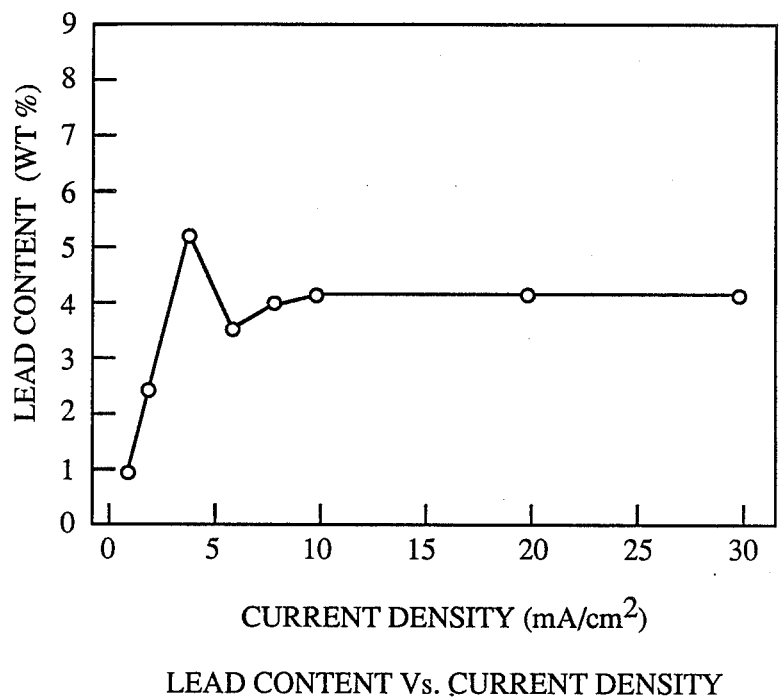
FIG. 2 shows a graph of lead content in a deposited Ag-Pb alloy versus current density for the bath of Example 1. Deposit thickness for analysis was one micron.

In one embodiment, antifriction overcoat 5 of FIG. 1 is formed by immersing the disk with strike layer 4 in a bath comprising silver and lead ions for about 3 to 5 seconds to ensure uniform wetting by the bath solution, and then applying a constant current to electrodeposit a thin antifriction coating of silver-lead having a thickness greater than 50 Å and less than 1,000 Å. The disk with strike layer 4 serves as the cathode and silver or silver-lead alloy sheets as the anode. The current is then stopped and the disk removed from the solution. The bath employed comprises:

Potassium hydroxide, KOH: 1.0 g/l
Potassium tartrate, $K_2C_4H_4O_6 \cdot \frac{1}{2}H_2O$: 87.0 g/l
Lead acetate, $Pb(C_2H_3O_2)_2 \cdot 3H_2O$: 1.8 g/l
Silver cyanide, AgCN: 15.2 g/l
Potassium cyanide, KCN: 25.0 g/l All salts are dissolved together in deionized water at room temperature with moderate stirring. After dissolution, more deionized water is added to obtain the above concentrations. The entire bath is filtered through a 1-micron porosity or finer filter, such as a Buchner filter under vacuum. An antifriction coating of silver-lead only 300 Å in thickness provides good lubrication and thus protects the underlying magnetic film 3. The percentage of lead in the silver-lead antifriction coating 5 is determined by the current density (or cathode potential). For the bath described above a current density of approximately 1.0 to 30.0 miliamperes/cm$^2$ is used in order to produce a silverlead antifriction coating having 1 to 5% of lead by weight. Generally, higher current density corresponds to a higher lead concentration. The effect of DC current density on the lead content in the electrodeposited Ag-Pb alloy from the above bath at room temperature is shown in FIG. 2. The behavior is complex, indicating some anomaly which is believed to be brought about by the strong cyanide complex of the silver ions and the weaker tartrate or acetate complex of the lead ions. The deposits used for the analysis shown in FIG. 2 were of 1 micron thickness.

By increasing the concentration of lead acetate on potassium cyanide or by decreasing the concentration of silver cyanide in the above bath, one may produce a lead content in the silver lead alloy up to 12% by weight or even higher: however, a lead content below 12% is preferable.

The above concentrations, except for potassium tartrate, are lower than the concentrations in baths used for plating the alloy Ag-Pb in unrelated bearing applications. See Faust et al, Trans. Electrochem Soc., 75, 185-196 (1939) and J. M. Booe, U.S. Pat. No. 2,545,566. These more concentrated baths were used to produce thick coatings for bearings. The higher concentrations in these baths were designed to eliminate deposit composition variation due to wide variations in the current density, temperature and stirring (See Faust et al.). The present invention, on the other hand, makes use of the lower concentrations of the respective ions in order to enhance the effect of current (or cathode potential) modulation on the composition modulation, as described below. More particularly, these high concentrations in these unrelated applications were used to prevent deposit morphology deterioration by concentration polarization (dilute bath, high current density, and lack of agitation). Morphology deterioration is a function of thickness and only commences at thicknesses of about 1 micron or above. However, deterioration of the deposit morphology due to concentration polarization is of no concern in the present invention since the overcoat is typically very thin, less than about 0.1 micrometer. The more dilute concentrations of the present invention also make the bath more economical, particularly with regard to silver and costs related to waste disposal of hazardous chemicals.

EXAMPLE 2

In another embodiment, the bath comprises potassium cyanide (75 g/l) and silver cyanide (4 g/l) and an antifriction overcoat 5 of FIG. 1 of pure silver is electroplated onto strike layer 4 to a thickness greater than 50 Å and less than 1000 Å. A silver anode is used, and the plating is carried out at room temperature and current density of 5–20 miliampers/cm$^2$.

The silver-lead alloy antifriction overcoat is, however, preferable in many applications. The silver-lead antifriction overcoat described in Example 1 containing 1–5% lead by weight has better antifriction properties than pure silver. This may be due to the local silver-lead eutectic melting during friction between the head and the overcoat. See, for example, "Friction and Wear With a Fully Melting Surface", Akstiffler, Journal of Tribology (Transactions of ASME), 106 416–419, (1984). Such melting is analogous to ice skating, where local melting of ice under pressure and friction results in a drastic reduction of the friction coefficient.

The metallic antifriction overcoat 5 is a soft film. While the hardness of the film has not been measured directly due to its extreme thinness (e.g. 300 Å), thicker deposits of the same composition plated under identical conditions have a hardness of less than 250 Kg/mm$^2$. See, for example, Safranek, *The Properties of Electrodeposited Metals and Alloys; A Handbook*, Chapter 17, *Silver and Silver Alloys*, American Elsevier Pub. Co., Inc., (1974): and Faust, et al., *Electrodeposition of Silver-Lead Alloys for Bearings*, Trans. of Electrochem. Society, 75, 185–196 (1939).

Film 5 of FIG. 1 may also be composed of soft, low-stress and ductile metals other than silver, such as palladium, platinum, gold, cadmium, indium, tin, and lead or an alloy including one or more of these metals. These metals have low chemical affinity to the head or slider materials, thereby eliminating friction-bonding, or galling, which is often the cause for failure. In addition, these metals have typical ranges of hardness, stress and ductility as given by Safrank, *The Properties of Electrodeposited Metals and Alloys*, pp. 3–18, American Elslivier Pub. Co., Inc., (1974). These metals are ductile and have ranges of low hardness and low internal stress, as given by Safranek, pages 3–18. Ductility, low hardness, and low internal stress are typically obtained for electrodeposits with low levels of impurities and defects. See Safranek, supra. Desirable mechanical properties of the above metals include hardness below about 250 Kg/mm$^2$ (as measured by the Knoop or Vickers techniques), internal stress (either tensile or compressive) of less than 20 Kg/mm$^2$, and ductility of more than 5% elongation. Among the above selected group of metals, only palladium and platinum have wide ranges of hardness and stress. All the others fall well within the desirable parameters for ductility, hardness, and internal stress. Since the mechanical properties depend on the deposition conditions such as bath composition, pH, temperature, current density or impurities, it is preferable to select the proper deposition conditions for palladium and platinum (see Safranek, supra) such that the deposited films will be at the low ends of their ranges of hardness and stress, and at the high end of their ductility range. Film 5 of FIG. 1 may also be an alloy including one or more of the above metals and may include other elements such as antimony, thallium, bismuth or copper with up to 20% by weight and preferably less than 10% by weight, selected to reduce corrosion or tarnishing, or to improve mechanical properties for wear resistance. All of the above films should be deposited so that their hardness is less than 250 Kg/mm$^2$, their ductility is greater than 5% elongation, and their stress is less than 20 Kg/mm$^2$. It should be noted that the above films are so thin that these properties are difficult to measure directly. Therefore when referring to such mechanical properties of thin layer 5 what is meant are the values for a thick film of the same material where these properties are measured directly.

EXAMPLE 3

In one preferred embodiment, antifriction overcoat 5 of FIG. 1 comprises silver-lead and antimony deposited on strike 4 of FIG. 1. Film 5 is electrodeposited using the bath given in the following table:

TABLE 1

| | |
|---|---|
| Potassium hydroxide, KOH | 1.0 g/l |
| Potassium tartrate, $K_2C_4H_4O_6 \cdot \frac{1}{2}H_2O$ | 87.0 g/l |
| Lead acetate, $Pb(C_2H_3O_2)_2 \cdot 3H_2O$ | 1.8 g/l |
| Silver cyanaide, AgCN | 15.2 g/l |
| Potassium cyanide. KCN | 25.0 g/l |
| Potassium antimony tartrate, $K(SbO)C_4H_4O_6 \cdot \frac{1}{2}H_2O$ | 2.5 g/l |

The plating is carried out at room temperature and silver or silver-lead sheets are used as anodes.

Figure 3:
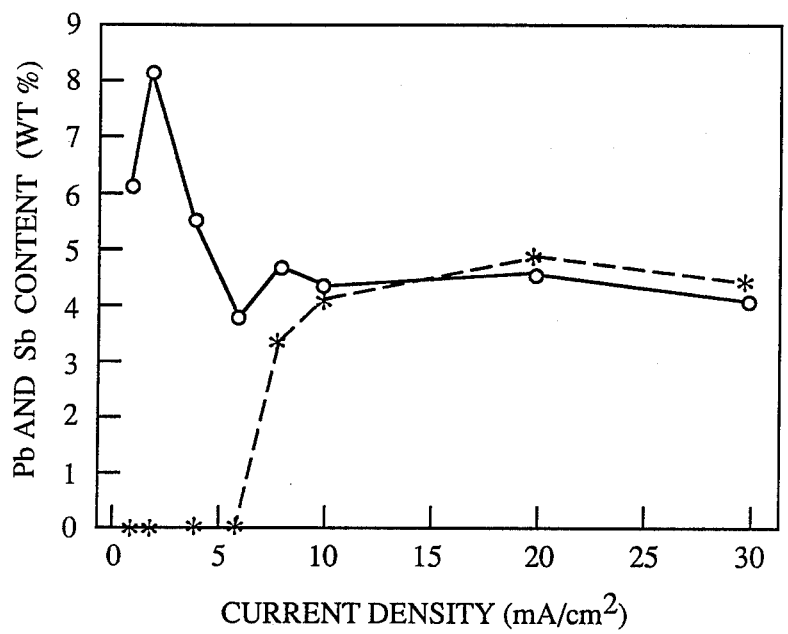
FIG. 3 is a graph of the lead and antimony content versus current density for the silver lead antimony alloy electroplated using the bath of Example 3. Deposit thickness for analysis was one micron.

A DC current density between 1 and 30 MA/cm$^2$ is employed to produce a layer between 50 and 500 Å thick having proportions of silver, lead and antimony, similar to FIG. 3. FIG. 3 shows the content of lead and antimony in the sliver-lead-antimony alloy (of 1 micron thickness) vs. the DC current density. Again, the behavior is quite complex, but antimony follows the normal behavior of the least noble metal in the system.

The bath of Example 3 may be modified as indicated in the following table:

TABLE 2

| | |
|---|---|
| Potassium hydroxide, KOH | 0–5 g/l |
| Potassium tartrate, $K_2C_4H_4O_6 \cdot \frac{1}{2}H_2O$ | 25–100 g/l |
| Lead acetate, $Pb(C_2H_3O_2)_2 \cdot 3H_2O$ | 0.5–5.0 g/l |
| Silver cyanide, AgCN | 5.0–50 g/l |
| Potassium cyanide, KCN | 10–150 g/l |
| Potassium antimony tartrate, $K(SbO)C_4H_4O_6 \cdot \frac{1}{2}H_2O$ | 0.5–20 g/l |

The plating may be carried out at temperatures ranging from 15°–85° C. (with room temperature being preferred) using a current density of 0.5 to 50 MA/cm$^2$ in order to produce an alloy having 0 to 20% antimony and 0 to 20% lead by weight, with an antimony content of 10% (by weight) or less being preferred.

The thickness of the antifriction film involves a tradeoff, since the thinner the film, the closer the head is to magnetic film 3 of FIG. 1, and the stronger the magnetic signals that are received by the head during read mode or by the magnetic film during write mode. However, the thicker the antifriction film, the more protection. Good protection of magnetic film 3 is achieved by an antifriction overcoat 5 having a thickness of 300 Å, and it is believed that films having a thickness even less than 300 Å also provide adequate antifriction protection. Of course the antifriction overcoat may be thicker than 300 Å, but films thicker than approximately 1000 Å are not desirable because of the increased distance between the head and the magnetic media which reduces the signal amplitude. The thickness of the antifriction overcoat is preferably greater than 50 Å, and less than 500 Å.

For applications requiring intimate contact between the head and the magnetic film, such as flexible or perpendicular magnetic recording media, e.g., a tape or floppy disk, the antifriction overcoat layer 5 may be somewhat thicker, but preferably less than 10,000 Å and more preferably less than 3,000 Å.

Figure 4:
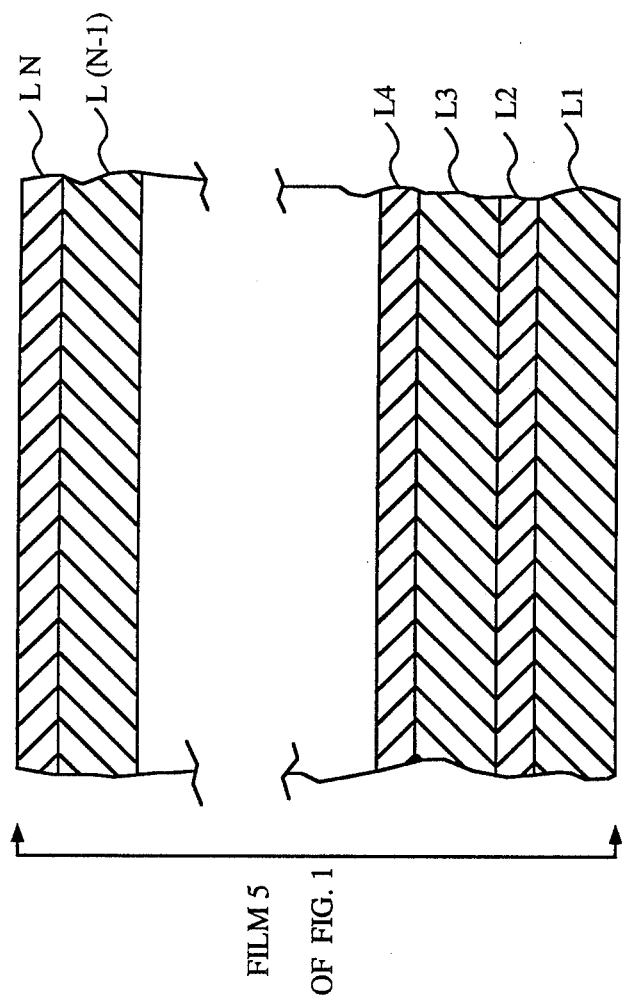
FIG. 4 shows a schematic cross-section of overcoat layer 5.

Of importance, it has been discovered that the antifriction and protective properties of silver-lead antifriction overcoat 5 described above in Example 1 is enhanced when overcoat 5 is applied by cyclically varying the current density (or cathode potential) with time to produce a layered structure having N layers as shown schematically in FIG. 4, having two or more layers per cycle. The concept of utilizing antifriction cyclical multilayered alloy silver-lead coatings for applications in high-density plated magnetic media is new and entirely different from the present trends. Whereas the prior art emphasized hard coatings such as cobalt oxide (formed by partial oxidation of the magnetic layer) or plated rhodium or nickel-tin or diamond-like sputtered carbon films, the present invention involves the application of softer, antifriction metallic coatings with an artificial layered structure analogous to the natural layered crystalline structure of solid lubricants such as graphite or molybdenum disulfide. However, the soft metallic coatings of the present invention have distinct advantages in that they are nonparticulate, continuous, uniform, and having excellent adhesion to the magnetic layers produced by metal to metal bonding. The method of the present invention uses a conventional electrolytic cell (previously described) in which either the current or cathode potential output of the DC power supply is modulated by a function generator to produce the desired waveform for the plating current density. The disk serves as the cathode and silver or silver-lead sheets as the anode. In one embodiment the odd layers L1, L3, . . . are richer in silver and poorer in lead than the even layers L2, . . . . In another embodiment the even layers are richer in silver and poorer in lead than the odd layers. In FIG. 4 an overcoat having N layers is shown where N is a possible integer greater than or equal to 2. However, it should be understood that the layers need not be of the same thickness. It is preferable however to have between ten and forty layers in the antifriction overcoat. Each layer may have a thickness from 10 Å to 1 micron.

EXAMPLE 4

In one embodiment N=12 and the odd layers L1, L3 . . . L11 and the even layers L2, . . . L12 are approximately 25 Å in thickness. This is achieved by applying 6 cycles of a plating current density having a waveform as shown schematically in FIG. 5 to the bath of Example 1.

Figure 5:
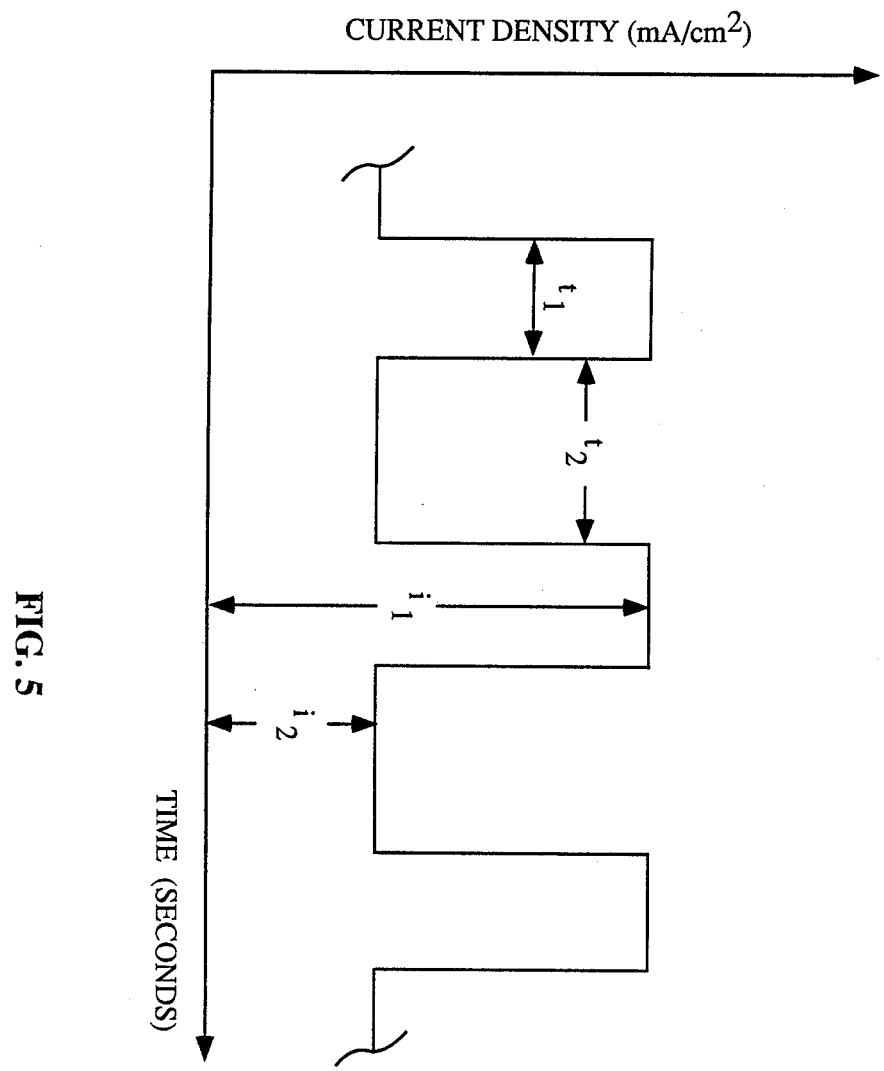
FIG. 5 shows a schematic stepped waveform of current density versus time. A similar waveform of cathode potential versus time may also be utilized.

The plating current density waveform shown in FIG. 5 is a stepped waveform where $t_1$ is the duration of current density $i_1$, and $t_2$ is the duration of current density $i_2$. Six cycles of a stepped waveform with $i_1$ equal to 10 miliamperes/cm$^2$, $t_1$ equal to 0.25 seconds, $i_2$ equal to 1 miliamperes/cm$^2$, and $t_2$ equal to 2.5 seconds, generate a film 300 Å thick having 12 layers (2 layers per cycle), each approximately 25 Å in thickness. For this choice of plating current density parameters, the even layers are poorer in lead (1 to 4% by weight) and the odd layers are richer in lead (3 to 7% by weight).

The purpose of forming layers of silver-lead which are alternately richer in lead and poorer in lead is to form adjacent layers with different lattice or microstructural and associated mechanical properties so that there tends to be horizontal (or parallel) shear between adjacent layers under shearing stress of head impact or friction. Frictional forces, when applied to such laminated composite-like structures, tend to cause parallel slipping or shearing of the layers across each other rather than breaking across the thickness of the overcoat. This is analogous to the crystalline layered structure of graphite or molybdenum disulfide, where interbonds between layers are relatively weak and intrabonds in a layer are stronger. Shearing forces parallel to the layers cause the breaking of interbonds but not intrabonds, thus producing slipping of layers across each other. However, particulate graphite or molybdenum disulfide, when applied as an antifriction overcoat, assume more or less random orientation, with many of the grains having their layers perpendicular to or at a large angle to the surface of the disk. Such grains present high friction and poor wear resistance, leading to their detachment and breaking of the film with associated head crash. These natural layered crystalline materials, even when deposited by vapor deposition techniques such as sputtering or vacuum deposition, are polycrystalline, having random orientation of the crystallites with respect to the disk surface. Again, the crystallites with layers oriented perpendicular to or at a large angle to the disk surface present high friction to the sliding head.

It is known that the solid solubility of lead in silver at temperatures below 250° C. is less than 0.35% lead by weight. See Hansen, *Constitution of Binary Alloys*, McGrall-Hill, (1958), Silver-Lead, pp. 40–41. Under equilibrium conditions layers with zero or very low lead concentration, thus have a single-phase microstructure (with silver matrix), and layers richer in lead have a two phase microstructure: silver matrix with lead precipitate. Whereas the former are softer and more ductile, the latter are harder and less ductile. However, in electrodeposited alloys, up to about 10% by weight of lead can be held in metastable supersaturated solid solution (See E. Raub and M. Engel, Z. Elektrochem., 49, 89–97, (1943). Also see phase diagram, p. 41 of Hansen, supra.). The tendency to precipitate a second phase from a metastable supersaturated solid solution (single-phase) increases with the extent of supersaturation. The higher the supersaturation the more the system is driven to a spontaneous precipitation of the second phase, upon heating (including friction) and time.

If one ignored the phenomenon of supersaturation, to alternate layers between single-phase and two-phase in the Ag-Pb system at room temperature, one layer (single-phase-Ag) must contain less than approximately 0.35% of Pb, and the other layer should have more than 0.35% Pb. However, due to the supersaturation of electrolytic alloys, both of these might be a single-phase. To facilitate precipitation of the second-phase (Pb in the Ag-matrix), the lead content of the second layer should be more than about 3% by weight and preferably in the range of 4-12% by weight. For practical purposes, the lead content of the single-phase layer can be in the range of 0-5% by weight. As hardness and ductility are related to the lead content also in solid solution, the above laminated composite-like character is achieved even if segregation of a second phase is lacking.

The cyclical multilayered alloy (CMA) coatings of the alloy silver-lead described above possess superior antifriction properties, rendering them useful in applications where low friction and wear is required between the recording medium and the head.

For example, disks overlaid with the coating of Example 4 routinely pass the ANSI standard test of 10,000 contact start/stops on the same track with head load of 9.5 grams with no failures. In particular, read/write heads with a ferrite slider or thin film heads of alumina with a titanium carbide slider perform well with this overcoat. Thin film heads with a 15 g load were tested at a flight height of 5-6 microinches with no failure (whereas state of the art media using a sputtered carbon overcoat require a flight height of at least 10 microinches). The close proximity of the head poles to the magnetic film facilitates read/write recording with very high density storage media. Electroplated disks (5¼ inch diameter) with magnetic coatings in accordance with copending patent application Ser. No. 06/670,135 and with the antifriction overcoats of Example 4 or Example 5 (below) having a storage density in excess of 30 million flux changes per square inch (which is equivalent to approximately 4 megabytes per square inch) were read/write tested at 70% of the isolated pulse amplitude.

The antifriction properties of silver-lead coatings, as well as their corrosion resistance, may be further improved by co-depositing one or more of the elements antimony, bismuth, tin, thallium or copper, up to 20% by weight, and preferably less than 10% by weight. The addition of about 1 to 5% by weight of antimony has proved to virtually eliminate the tarnishing of silver-lead coatings in aggressive environments containing high sulfide concentrations.

EXAMPLE 5

Using the silver-lead-antimony bath described in Example 3, a layered structure shown schematically in FIG. 4 with N=13 was produced by applying a stepped waveform as in FIG. 5 with the following parameters $i_1 = 40$ mA/cm$^2$; $t_1 = 0.062$ sec; $i_2 = 4$ mA/cm$^2$; $t_2 = 0.625$ sec. The thickness of each layer is approximately 25 Å. The average composition of the overcoat is as follows: 92% Ag, 4% Pb and 4% Sb by weight. The content of antimony varies between the alternating layers in each cycle. The average content of antimony in the entire overcoat should preferably be in the range of 1 to 10% by weight, and more preferably in the range of 3 to 7% by weight. Usually it is advantageous to apply the first (or innermost) layer of the overcoat by using the higher current density of FIG. 5. This practice has the benefits of a strike layer, such as improved throwing power and uniform coverage of the substrate, and reducing displacement reactions with the plating bath. The outermost layer of the coating should preferably be the layer with less lead or with more antimony content. This can be accomplished simply by stopping during or at the end of the corresponding step of the cycle. The purpose of having the outermost layer consist of a single-phase solid solution is to provide a softer layer over a harder layer, thereby enabling an easier shearing of the layers with the result of low friction. The higher content of antimony in the top layer provides protection against tarnishing. Disks plated as in Example 5 routinely pass the test of 10,000 contact start/stops with no failures, and have excellent resistance to tarnishing.

Figure 6:
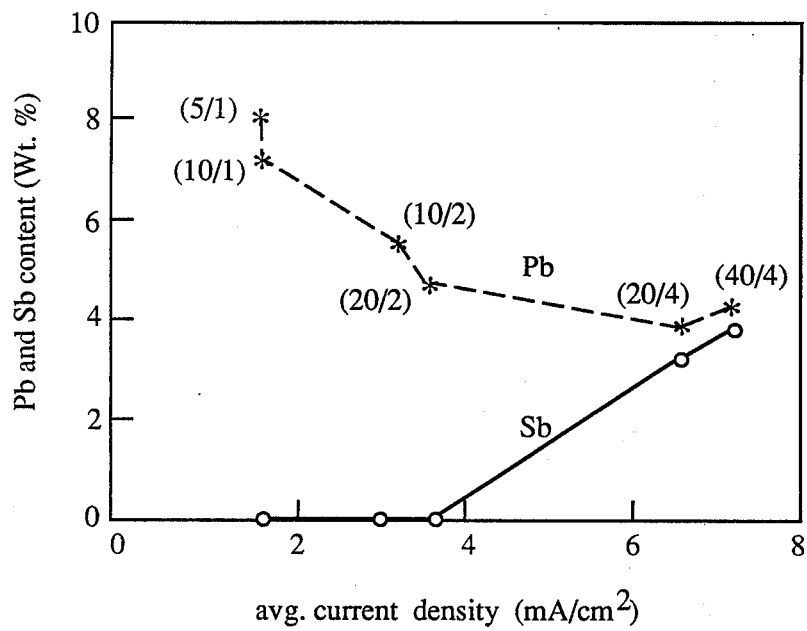
FIG. 6 shows the content of lead and antimony in the cyclically multilayered alloy (CMA) of Ag-Pb-Sb versus the average current density for the bath of Example 3. Deposit thickness for analysis was one micron, and the CMA parameters for each point are given in Table 3.

FIG. 6 shows the average content of lead and antimony by weight in the deposited CMA Ag-Pb-Sb using the bath of Example 3 for six choices of $(i_1/i_2)$, $t_1$ and $t_2$ for the waveform of FIG. 5 as given in Table 3, where N=400 and the total thickness of the overcoat is 10,000 Å (one micron) for the purpose of analysis.

| Data Point (in FIG. 6) | Current Density in MA/cm$^2$ | Time (sec) |
|---|---|---|
| (5/1) | $i_1 = 5$ | $t_1 = 0.5$ |
| | $i_2 = 1$ | $t_2 = 2.5$ |
| (10/1) | $i_1 = 10$ | $t_1 = 0.25$ |
| | $i_2 = 1$ | $t_2 = 2.5$ |
| (10/2) | $i = 10$ | $t_1 = 0.25$ |
| | $i_2 = 2$ | $t_2 = 1.25$ |
| (20/2) | $i_1 = 20$ | $t_1 = 0.125$ |
| | $i_2 = 2$ | $t_2 = 1.25$ |
| (20/4) | $i = 20$ | $t_1 = 0.125$ |
| | $i_2 = 4$ | $t_2 = 0.625$ |
| (40/4) | $i_1 = 40$ | $t_1 = 0.062$ |
| | $i_2 = 4$ | $t_2 = 0.625$ |

Actual disks were plated similarly with the same waveform parameters, but only with N=13 and total overcoat thickness of about 325 Å.

Using a silver-lead-antimony bath selected from Table 2 and appropriate choices for the parameters of the stepped waveform in FIG. 5, one may produce a CMA layered overcoat of silver-lead-antimony wherein the even layers contain 92 to 99% silver, 1 to 8% lead and 0 to 2% antimony by weight and wherein the odd layers contain 86 to 96% silver, 4 to 12% lead and 2 to 12% antimony by weight. By switching the order of the current steps in the waveform of FIG. 5, one can switch the order of the layers, producing same composition in the even layer as was before in the odd layer, and vice versa.

Figure 7:
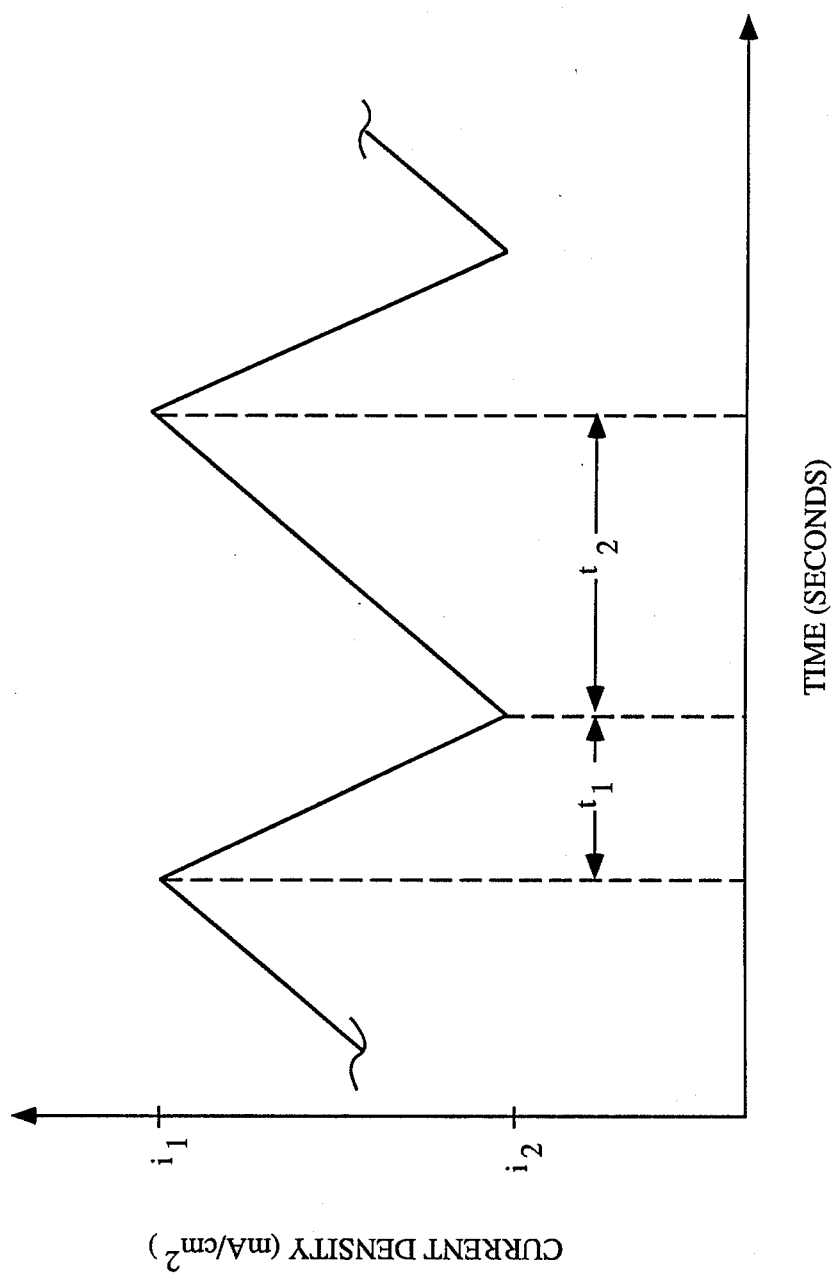
FIG. 7 shows a triangular or swept waveform for applied current density as a function of time.

It should be noted that the duration of the high or low values of current density as illustrated by the waveform shown in FIG. 5 can be varied and controlled by the function generator to achieve desired thickness of the layers L1, ... LN. The thickness of each layer is directly related to the amount of electric charge utilized during its electrodeposition. Thus, for a given current density, the thickness of a layer is controlled by the time the current is applied to the electrolytic cell. The composition of the plated alloy can be varied and controlled by changing the current density (or cathode potential) to a value which gives the desired composition. FIG. 7 provides another example of a graph of a current density versus time which may be used to generate another layered structure. A similar waveform may be applied to the cathode potential. The result of the use of this triangular or swept waveform is a triangular or graded variation in the composition of the alloy layers plated.

Figure 8:
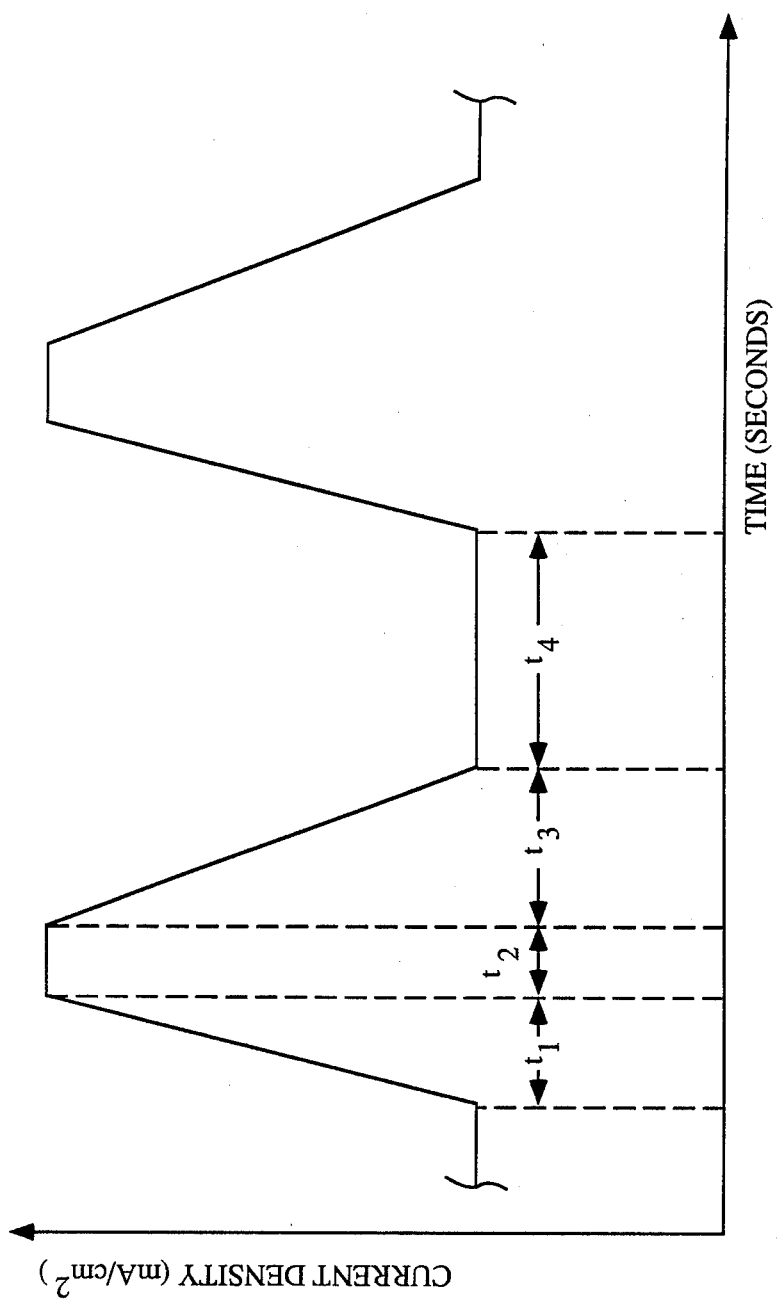
FIG. 8 shows a schematic current density waveform for producing four layers per cycle.

FIGS. 5 and 7 are merely examples of the many waveforms which may be employed in order to form a layered structure. Other alternative embodiments of the present invention include electrodepositing more than two layers per cycle. This is accomplished by creating a series of different current densities or cathode potentials before repeating the cycle. Thus, it can be seen that the method of this invention permits the design of a resulting plated structure by variation of the magnitude of the current or cathode potential applied and the duration that a given current density or cathode potential is applied. In particular, the waveform shown in FIG. 8 may be used to produce four layers per cycle: a first layer of graded composition during time period $t_1$; a second layer of constant composition during time period $t_2$; a third layer of graded composition during time period $t_3$; and a fourth layer of constant composition during time period $t_4$. Similarly, other combinations of stepped, triangular, and sine waveforms may also be utilized. The waveform can be tailored to provide a structure of multilayered alloy coating with optimum mechanical wear resistance and corrosion resistance properties by depositing layers with desired microstructural and compositional properties.

For example, suppose it is desired to produce a cyclic mutlilayered alloy having 20 layers $L_1, \ldots L_{20}$ where the odd layers have a selected thickness $H_O$ and a selected composition percentage $C_O$ of one component of the alloy being plated and the even layers have a selected thickness $H_E$ and a selected composition percentage $C_E$ of the same component where $C_O$ is not equal to $C_E$. As long as both of the selected thicknesses are relatively large, say greater than 1,000 Å, one may determine the appropriate plating current density as follows:

a. determine the steady state DC current density $i_O$ which produces the desired composition $C_O$ then determine the time $t_O$ required to produce the desired thickness for the odd layers by solving the equation $H_O = K_{iO} t_O$ for $t_O$, where K is a constant.

b. next, determine the steady state DC current density $i_E$ which produces the desired composition $C_E$ and the corresponding time $t_E$ by solving the equation $H_E = K_{iE} t_E$ for $t_E$.

c. then define the current density waveform by $$i(t) = i_0 \text{ for } t \text{ in odd intervals}$$
$$i_E \text{ for } t \text{ in even intervals}$$

This current density having the frequency $$f = \frac{1}{t_0 + t_E},$$

produces the desired composition for the cyclical multilayered alloy coating.

However, I have discovered that if either the even layers or the odd layers or both are thin, for example 50 Å, then the above approach does not provide the desired composition in the alternating layers. In fact, using the above method, the composition modulation is too small if either the even layers or the odd layers or both are thin, say <500 Å. In order to achieve the desired composition modulation and maintain the selected thickness $H_O$ and $H_E$ it is therefore necessary to increase the current (or cathode potential) modulation, i.e., to adjust $i_O$ and $t_O$ to new values $i'_O$ and $t'_O$, and to simultaneously adjust $i_E$ and $t_E$ to new values $i'_E$ and $i'_O$. For example, if $C_O$ is greater than $C_E$, $i_O$ must be increased to a new value $i'_O$ and simultaneously $t_O$ must be proportionally decreased to a new value $t'_O$ in order to obtain the proper thickness $H_O$ since $H_O = K i'_O t'_O$. Similarly, $i_E$ may be decreased to a new value $i'_E$ and $t_E$ must be proportionally increased to a new value $t'_E$. The appropriate current density waveform which produces the desired composition modulation has a frequency of $$f = \frac{1}{t'_O + t'_E}.$$

The above analysis may be generalized. Suppose it is desired to produce an overcoat containing N layers $L_1, \ldots L_N$, each layer $L_j$ having a selected composition $C_j$ where $j = 1, \ldots, N$ and each layer having a selected thickness $H_j$ where $j = 1, \ldots, N$. One first determines for each j the current density $i_j$ of the steady state DC plating current which will produce the desired composition $C_j$. One then determines for each j the time $t_j$ required to produce the required thickness during steady state DC operation with a current density $i_j$ by solving the formula $H_j = K_{ij} t_j$ for $t_j$. One then applies the plating current waveform defined by setting the current density $$i(t) = \begin{cases} i_0 \text{ for } 0 \leq t \leq t_1, \\ i_E \text{ for } t_1 < t \leq t_1 + t_2, \\ i_0 \text{ for } t_1 + t_2 < t \leq t_1 + t_2 + t_3, \\ \text{etc.} \end{cases}$$

If any of the above layers $L_j$ are thin, for example, if $H_j$ is less than say 300 Å, the above formula does not provide the appropriate current density. One, however, begins with this formula and then simultaneously adjusts the magnitude $i_j$ of the current density iteratively to a new value $i'_j$ to produce the approximate composition desired and simultaneously adjusts the time $t_j$ to $t'_j$ where $t'_j = H_j / K i'_j$ in order to produce the desired thickness $H_j$. Thus in general if $i'_j$ is greater than $i_j$, the time $t'_j$ is proportionally less than $t_j$ and conversely since the thickness varies directly with the current density. The procedure described above may require several iterations to obtain the desired layer composition and thickness.

It has also been observed that if one has determined a cyclic current density waveform as in FIG. 5 which produces a CMA structure having two layers per cycle wherein the even layers and the odd layers each have a desired thickness and a desired percentage of a selected metal, and one then increases the frequency of the current density waveform while holding the amplitude modulation of the current density waveform constant, the composition modulation, i.e. the absolute value of the difference between the maximum and minimum content of a selected metal in the even and odd layers, tends to decrease when the even or the odd layers become thin, i.e. less than 500 Å.

Therefore in order to hold the composition modulation constant and the thickness ratio (i.e. the ratio of the thickness of the even and odd layers) constant as one increases the frequency (or layer density) it is necessary to simultaneously increase the amplitude modulation of the current density waveform (in order to maintain the composition modulation constant) and to adjust the period of each half cycle (in order to hold the thickness ratio constant).

The above invention has been described with respect to a hard disk. However, as will be clear to those of average skill in the art, the invention may also be applied to other magnetic media. For example, substrate 1 of FIG. 1 may be a flexible substrate such as a floppy disk or a tape consisting of plastic polymers. Similarly, while the antifriction plating technique described above is a preferred embodiment, due to its simplicity, versatility and low cost, other techniques for depositing the multilayer antifriction coatings described above may also be employed, such as chemical vapor depositions, sputtering, ion plating and evaporation techniques. The composition in the alternating layers may be controlled by sputtering alternatingly from different targets. If evaporation techniques are used, the composition in the alternating layers can be modulated by rotating a pinwheel shutter with radial cutouts above the sources. If chemical vapor deposition is employed, the composition in alternating layers can be modulated by modulating the gas composition. (See Cohen, et al, "Electroplating of Cyclic Multilayered Alloy (CMA) Coatings," J. Electrochem. Soc. 130, 1987 (1983).)

I claim:

1. A method of forming a magnetic recording member comprising the step of:
    forming an antifriction overcoat over a magnetic film for presenting a soft, low friction metallic surface for contacting a head member, said overcoat having a thickness less than 10,000 Å and comprising an alloy of silver and one or more of the following metals: cadmium, indium, tin, lead; said overcoat being formed so that it has a hardness less than 250 kg/mm$^2$.

2. The method of claim 1 wherein said alloy includes less than 20% total by weight of one or more of the following elements: antimony, bismuth, thallium or copper.

3. The method of claim 1 wherein said overcoat has a stress less than 20 kg/mm$^2$ and a ductility as measured by elongation of 5% or more.

4. The method of claim 1 wherein said alloy comprises silver and lead.

5. The method of claim 4 wherein the concentration of lead in said alloy comprising silver and lead is less than 20% by weight.

6. The method of claim 4 wherein said alloy comprising silver and lead further includes antimony.

7. The method of claim 6 wherein said antimony comprises less than 10% by weight of said alloy.

8. A method of forming a magnetic recording member comprising the step of:
    forming an antifriction overcoat over a magnetic film for presenting a soft, low friction metallic surface for contacting a head member, said overcoat comprising a plurality of layers, the composition of immediately adjacent layers of said plurality being distinct from one another, each of at least two immediately adjacent layers of said plurality comprising an alloy, the alloy in the first of said two immediately adjacent layers having a first proportion of a selected metal and the alloy in the second of said two immediately adjacent layers having a second proportion of said selected metal, said first proportion differing from said second proportion, said selected metal being palladium, platinum, silver, gold, cadmium, indium, tin or lead, said overcoat being formed so that it has a hardness less than 250 kg/mm$^2$.

9. The method of claim 8 wherein said step of forming an antifriction overcoat comprises forming each of said layers of said plurality so that it contains said alloy, the even layers in said plurality being richer in a selected metal of said alloy than the odd layers.

10. The method of claim 9 wherein said alloy comprises an alloy of silver and lead and said even layers contain at least 95% but less than 100% of silver by weight and at most 5% but more than 0% lead by weight and wherein said odd layers contain 88 to 96% silver by weight and 12 to 4% lead by weight.

11. The method of claim 9 wherein said alloy comprises an alloy of silver and lead and said odd layers contain at least 95% but less than 100% of silver by weight and at most 5% but more than 0% lead by weight and wherein said even layers contain 88 to 96% silver by weight and 12 to 4% lead by weight.

12. The method of claim 8 wherein said step of forming an antifriction overcoat includes forming said overcoat to a total thickness greater than 50 Å and less than 10,000 Å.

13. The method of claim 8 wherein said alloy is formed to include less than 20% total by weight of one or more of the elements antimony, bismuth, thallium or copper.

14. The method of claim 8 wherein said forming comprises electroplating said overcoat while controlling the plating current density or cathode potential as a function of time in order to produce a selected thickness and a selected composition in said at least two immediately adjacent layers.

15. The method of claim 14 wherein said controlling comprises cyclically modulating the current density or cathode potential as a function of time in order to produce two or more layers in a cycle.

16. The method of claim 15 wherein said cyclically modulating is accomplished by generating a plating current density or a cathode potential having a stepped wave form.

17. The method of claim 15 wherein said cyclically modulating is accomplished by generating a plating current density or a cathode potential having a triangular wave form.

18. The method of claim 15 wherein said cyclically modulating is accomplished by generating a plating current density or a cathode potential having a sinusoidal wave form.

19. The method of claim 15 wherein said cyclically modulating is accomplished by generating a plating current density or a cathode potential having a wave form comprising a constant portion and a linear, non-constant portion.

20. A method of forming a magnetic recording member comprising the step of forming an antifriction overcoat having a hardness less than 250 kg/mm$^2$ over a magnetic film for presenting a soft, low friction metallic surface for contacting a head member, said overcoat comprising a plurality of N layers where N is a positive integer greater than or equal to 3, the compositions of immediately adjacent layers of said plurality being distinct from one another, said compositions being controlled by sputtering alternatingly from different targets, each of said targets comprising a metal selected from the group consisting of palladium, platinum, silver, gold, cadmium, indium, tin and lead.

21. The method of claim 20 wherein the composition of at least one of said N layers comprises an alloy.

22. The method of claim 21 wherein said alloy comprises silver and lead.

23. The method of claim 22 wherein said alloy further comprises antimony.

24. The method of claim 20 wherein said forming produces a total thickness of said overcoat greater than 50 Å and less than 10,000 Å.

25. The method of claim 1 or 8 wherein said step of forming an antifriction overcoat comprises electroplating said overcoat over said magnetic film.

26. The method of claim 25 further including the step of electroplating a strike layer over said magnetic layer before electroplating said overcoat, said strike layer comprising gold, platinum, palladium, iridium, rhodium, osmium, ruthenium, silver or an alloy thereof.

27. The method of claim 1 or 8 wherein said step of forming an antifriction overcoat comprises electroplating said alloy so that it contains less than 20% total by weight of one or more of the elements antimony, bismuth, thallium, or copper.

28. The method of claim 1 or 8 wherein said step of forming an antifriction overcoat comprises electroplating said alloy so that it comprises silver and lead, said lead being less than 20% by weight of said alloy.

29. The method of claim 28 wherein said alloy comprises silver, lead and antimony.

30. The method of claim 29 wherein said lead is between 0 and 12% by weight and said antimony is between 0 and 10% by weight of said alloy.

31. The method of claim 29 further including a step of preparing an electroplating bath comprising:
Potassium hydroxide, KOH: 0-5 g/l
Potassium tartrate, $K_2C_4H_4O_6 \cdot \frac{1}{2}H_2O$: 25-100 g/l
Lead acetate, $Pb(C_2H_3O_2)_2 \cdot 3H_2O$: 0.5-5.0 g/l
Silver cyanide, AgCN: 5.0-50 g/l
Potassium cyanide, KCN: 10-150 g/l
Potassium antimony tartrate, $K(SbO)C_4H_4O_6 \cdot \frac{1}{2}H_2O$: 0.5-20 g/l 32. The method of claim 1, 6, 8 or 13 wherein said step of forming an antifriction overcoat comprises sputtering said overcoat over said magnetic film.

33. The method of claim 1 or 8 wherein said step of forming an antifriction overcoat comprises evaporating said overcoat over said magnetic film.

34. The method of claim 1, 8 or 20 further including the step of forming said magnetic film on a substrate.

35. The method of claim 34 wherein said substrate is a disk.

36. A method of forming a magnetic recording member comprising the step of:
forming an antifriction overcoat over a magnetic film for presenting a soft, low friction metallic surface for contacting a head member, said overcoat having a thickness less than 10,000 Å and comprising an alloy of silver and one or more of the following metals: cadmium, indium, tin, lead; and wherein said alloy comprises less than 20% total by weight of one or more of the following elements: antimony, bismuth, thallium or copper.

37. A method of forming a magnetic recording member comprising the step of:
forming an antifriction overcoat over a magnetic film for presenting a soft, low friction metallic surface for contacting a head member, said overcoat having a thickness less than 10,000 Å and comprising an alloy of silver and lead, wherein said alloy of silver and lead comprises less than 20% lead by weight.

38. A method of forming a magnetic recording member comprising the step of chemically vapor depositing an antifriction overcoat having a hardness less than 250 $kg/mm^2$ over a magnetic film for presenting a soft low friction metallic surface for contacting a head member, said overcoat comprising of plurality of N layers where N is a positive integer greater than or equal to 3, the compositions of immediately adjacent layers of said plurality being distinct from one another, said compositions being controlled by modulating the gas composition employed in said step of chemically vapor depositing.

39. A method of forming a magnetic recording member comprising the step of evaporating an antifriction overcoat having a hardness less than 250 $kg/mm^2$ over a magnetic film for presenting a soft, low friction metallic surface for contacting a head member, said overcoat comprising a plurality of N layers where N is a positive integer greater than or equal to 3, the compositions of immediately adjacent layers of said plurality being distinct from one another, said compositions being controlled by rotating a shutter above a plurality of sources.

40. A method of forming a magnetic recording medium comprising the step of:
forming an antifriction overcoat over a magnetic film for presenting a low friction metallic surface for contacting a head member, said overcoat comprising a plurality of N layers where N is a positive integer greater than 3, the composition of immediately adjacent layers of said plurality being distinct from one another, at least one of said layers comprising an alloy comprising a first metal selected from the group consisting of palladium, platinum, silver, gold, cadmium, indium, tin and lead and a second metal selected from the group consisting of antimony, bismuth, thallium and copper, said alloy containing less than 20% total by weight of said second element.

* * * * *